Oct. 20, 1959 V. F. PROCOPIO ET AL 2,909,639
METHOD FOR ELECTRICAL ETCHING OF METAL FOILS
Filed Oct. 25, 1957

INVENTORS,
VINCENT F. PROCOPIO
JAMES W. ROY.
BY
Harry M. Saragovitz
ATTORNEY.

United States Patent Office 2,909,639
Patented Oct. 20, 1959

2,909,639

METHOD FOR ELECTRICAL ETCHING OF METAL FOILS

Vincent F. Procopio, Emerson, N.J., and James W. Roy, Lenox, Mass., assignors to the United States of America as represented by the Secretary of the Army Application October 25, 1957, Serial No. 692,505

4 Claims. (Cl. 219—69)

This invention relates to a new method of increasing the surface of valve-action metals such as aluminum or tantalum that are to be used in the form of metal foils as electrodes in electrolytic capacitors.

It has been known to improve the capacity of electrolytic capacitors by etching the electrodes to increase their effective surface area. Heretofore, surface increase has been obtained only by mechanical, chemical, or electrochemical methods. Mechanical methods usually consist in sand-blasting or scratch-brushing of the metal surface; in using electrochemical or chemical methods the metal is immersed in a liquid which acts with or without electric current as an etching solution.

The method of the present invention differs essentially from these known methods in that etching is carried out by drawing a multiplicity of electric arcs of controlled current values from the surface of the metal to be etched. The metallic molecules comprising the arc source are sufficiently excited by the energy of the arc to vaporize and be torn from the surrounding metal to the conducting point which initiated the arc, thus causing a pit to be formed on the metal surface. By increasing the energy level of the spark, more metal molecules are excited to the vapor state and carried away (redistributed over the metal surface in some cases) to leave a larger pit. The pit size, therefore, may be controlled at will by controlling the wattage of the arc. This feature is desirable since the thickness of the oxide film formed on capacitor electrodes varies with the voltage rating of the capacitor, tending to nullify the etched surface by filling in or covering over the pits as the oxide thickness increases. The advantage of varying the pit size to accommodate the oxide thickness becomes apparent when the wide range of capacitor voltage ratings is considered. The degree of surface is proportional to the number of pits obtained in a given perimeter within limits determined by the pit size.

The etching arc may be initiated by breakdown of the gaseous medium that constitutes the gap between the metal foil and adjacent points when the potential difference across the gap is sufficient, or drawing oppositely charged points away from contact with the metal foil surface. While the former method appears to have some advantage for the etching of tantalum, we prefer the latter for the etching of aluminum.

The invention will become more apparent from the following description and accompanying drawing of a specific apparatus for the etching of aluminum foil by the contact method.

Figure 1:
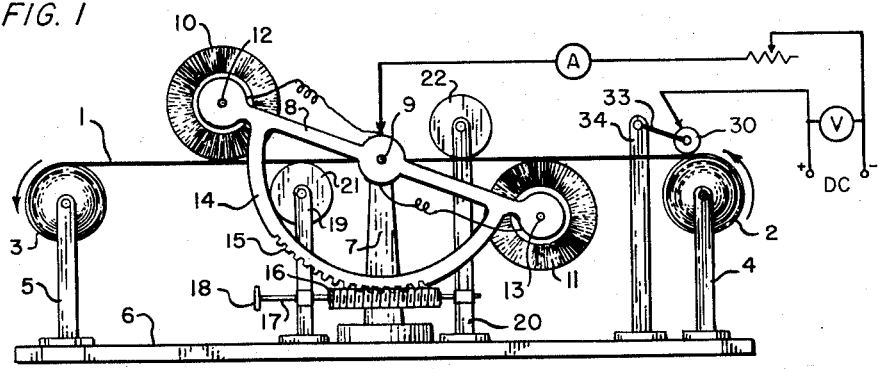
Fig. 1 is an elevational view of the apparatus for etching aluminum foil.

As shown in Fig. 1 the aluminum foil 1, both surfaces of which are to be etched, is passed from roller 2 to roller 3, said rollers 2 and 3 being supported by posts 4 and 5 which are secured to a base 6.

Between the rollers 2 and 3 there is provided a rotating brush assembly comprising two wire brushes 10 and 11 which are kept in contact with the upper and lower surface of the foil 1 in its passage from roller 2 to 3. This rotating brush assembly is supported by a central post 7 secured to the base 6. An adjustable rocker arm 8 is pivoted at 9 at the upper end of post 7, which rocker arm 8 carries at its ends the wire brushes 10 and 11 rotatably secured with shafts 12 and 13 to the ends of said arm 8. The rocker arm 8 is provided with a downwardly extending arcuate frame 14. The outer periphery of the frame 14 has gear teeth which cooperate with a worm 16 on a shaft 17 supported by posts 19 and 20 which posts are secured to the base 6. Movement of the shaft 17 is controlled by a handle 18. Rotation of the handle 18 will regulate the gap between the ends of the filaments of the wire brushes 10 and 11 and the surface of the aluminum foil 1. The posts 19 and 20 also carry idler rollers 21 and 22, the roller 21 being positioned below the foil 1, the roller 22 above the foil 1.

Figure 2:
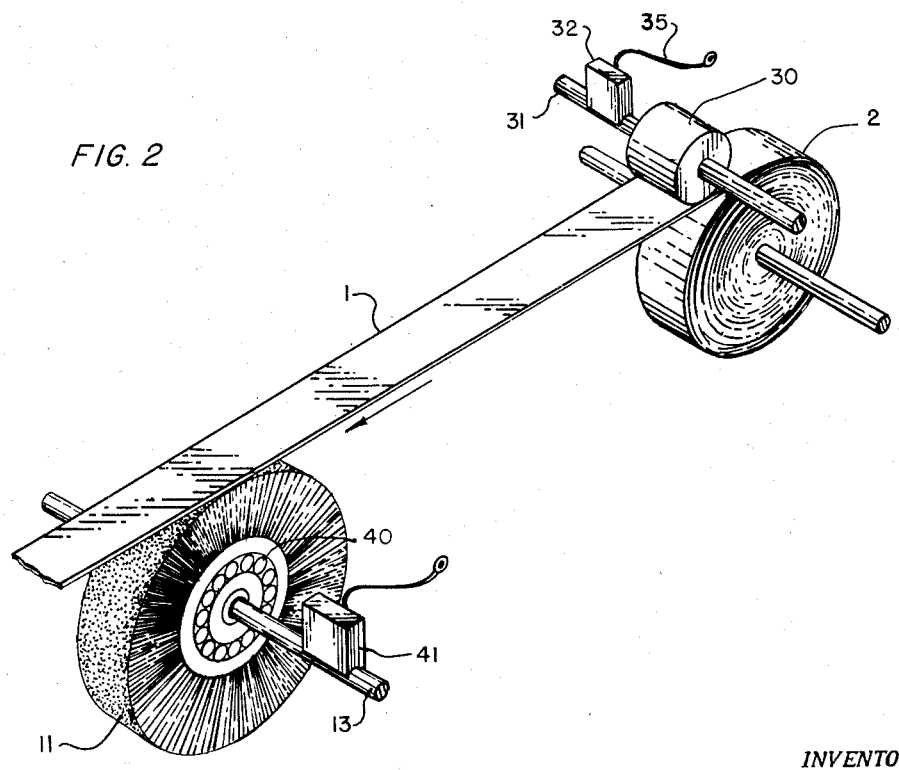
Fig. 2 is a perspective view of a portion of the apparatus shown in Fig. 1.

In order to draw a multiplicity of electric arcs of controlled current values from the upper and lower surface of the metal foil 1 a source of D.C. potential (e.g., a battery) is connected to the foil 1 and the wire brushes 10 and 11 in the manner indicated in Figs. 1 and 2.

Figs. 1 and 2 show the connection of the positive pole of a D.C. source with the foil 1 by means of a roller 30. The roller 30 is supported by a shaft 31, said shaft being held by bearings (not shown in the drawing) that are contained at the end of an insulated arm 33 pivoted at the end of a post 34 secured to the base 6. A graphite brush 32 makes continuous contact with the shaft 31 and is connected through wire 35 with the wires leading to the positive pole of the D.C. source, thus connecting the foil 1 electrically with the D.C. source.

The wire brush 11, which is rotatably held by shaft 13 by means of ball bearings 40, is electrically connected with the negative pole of the D.C. source by means of a graphite brush 41 making continuous connection from the negative pole of the D.C. source to the shaft and eventually to the filaments of the wire brushes 10 and 11.

Shafts 12 and 13 of the wire brushes 10 and 11 rotate in bearings that insulate electrically the shafts from the rocker arm 8.

Both the contact roller 30 and the wire brushes 10 and 11 are driven by their continuous frictional engagement with the foil 1 which in turn is moved by the driven roller 3.

In rotating the wire brushes 10 and 11 the gaps between the end points of a number of individual filaments and the metal foil become narrow to the point where an arc will strike between foil and filament. This arc will be sustained until physical contact is made between the filament and the foil. Similarly an arc will strike between this filament and the foil when the physical contact is interrupted by further rotation of the wire brush until the gap between the foil and the filament becomes so great that the arc is interrupted.

Thus in etching the aluminum foil 1 by the contact method in the apparatus shown in Fig. 1 the foil 1 is passed tangentially across the periphery of the rotating wire brushes 10 and 11. Light contact is made between the wire ends of the individual filaments of the brushes and the surfaces of the aluminum foil 1, each contact briefly completing a D.C. circuit in which the foil is electrically positive to the brush. While potentials up to 100 volts and current values up to 50 amperes have been used we have found that voltages of the order of 6 volts and currents around 0.1 ampere per individual spark give good results. The total current passing through the circuit being the product of the amperes per arc times the number of arcs at any instant. With the rate of rotation of the wire brush, the number of wire ends available for contact and the total current maintained constant, the degree of etching is determined by the rate at which the foil surface progresses across the brush periphery.

The filaments of the wire brushes 10 and 11 may consist of tantalum or any other suitable metal or metal alloy. The aluminum or tantalum foil may be etched on either one or both sides.

Exploratory samples of electrically etched 3 mil aluminum foil were electrolytically oxidized as anodes at 200 volts in an electrolyte consisting of 23.6 gm. $H_3BO_4$/liter distilled water, ammoniated to 215–235 ohm/cm. at pH 7.6–7.9 with the following results.

|  | Inches per microfarad |
|---|---|
| Plain foil | 13.0 |
| High voltage electric etch | 9.15 |
| Low voltage electric etch | 3.0 |
| Acid etch | 2.0 |

The method of electrical etching according to the present invention has a number of great advantages over the known methods. It eliminates the use of chemical baths which change in composition as etching proceeds. The etching according to the invention can be controlled to produce a pit size that can be accommodated to the desired oxide film thickness. Contamination of the foil to be etched may be reduced by using arc-drawing points of the same metal as that being etched, or by using non-contaminating electrically conducting materials as the filaments of the wire brushes. Finally, oxidation may be prevented by carrying out the etching in an inert atmosphere.

It will be evident to those skilled in the art that many widely different embodiments of this invention can be made without departing from the scope of the inventive idea defined in the appended claims.

What is claimed is:
1. A method of etching electrodes for electrolytic capacitors which comprises supplying a positive direct current potential to a foil of a metal of the group consisting of aluminum and tantalum, moving said foil continuously through an inert atmosphere across the periphery of a rotating wire brush supplied with a negative direct current potential, the arc-drawing point of said brush being constructed of the same metal as the foil, and passing an electric arc at about 6 volts and about 0.1 ampere per individual spark between the foil and the brush and thereby etching the foil.

2. Apparatus for etching a continuous foil of electrically-conductive material in an inert atmosphere comprising a first means for positioning said foil and permitting continuous advance of the same, a second means supplying a positive direct-current potential to said foil, and at least one rotatable electrically-conductive brush in spaced relation with said first means supplied with a negative direct-current potential, said brush positioned to adjustably engage the foil to rotate with the advancement thereof, the direct-current potential between the foil, when in position, and the brush being such as to cause an electric arc therebetween and to etch the foil, the arc-drawing points of the brush being of the same metal as the foil.

3. The apparatus of claim 2 comprising at least one rotatable electrically conductive brush adapted to engage each side of said foil.

4. The apparatus of claim 2 comprising additionally means to adjust the engagement of the foil and the brush.

References Cited in the file of this patent

UNITED STATES PATENTS

| 2,365,539 | Flowers | Dec. 19, 1944 |
| 2,411,522 | Chevigny | Nov. 26, 1946 |
| 2,458,871 | Oles | Jan. 11, 1949 |
| 2,528,157 | Menke | Oct. 31, 1950 |
| 2,539,526 | Sickles | Jan. 30, 1951 |

FOREIGN PATENTS

| 465,285 | Germany | Jan. 9, 1927 |
| 731,953 | Great Britain | June 15, 1955 |